(12) United States Patent
Blair et al.

(10) Patent No.: US 8,449,692 B2
(45) Date of Patent: May 28, 2013

(54) HELIOSTAT FIELD CLEANING SYSTEM

(75) Inventors: Jason Blair, Pasadena, CA (US);
Stephen Brawner, Pasadena, CA (US);
Brian Coleman, Pasadena, CA (US);
Alan Greaney, Buena Park, CA (US);
Christian Gregory, La Crescenta, CA (US); Marc Grossman, Pasadena, CA (US); Gregg Luconi, Monrovia, CA (US); Carter Moursund, Pasadena, CA (US); Ulrik Pilegaard, Glendale, CA (US); Steven Schell, Arcadia, CA (US);
Craig Tyner, Albuquerque, NM (US)

(73) Assignee: Esolar, Inc., Burbank, CA (US)

( * ) Notice: Subject to any disclaimer, the term of this patent is extended or adjusted under 35 U.S.C. 154(b) by 551 days.

(21) Appl. No.: 12/704,860

(22) Filed: Feb. 12, 2010

(65) Prior Publication Data

US 2010/0206294 A1 Aug. 19, 2010

Related U.S. Application Data

(60) Provisional application No. 61/207,629, filed on Feb. 13, 2009.

(51) Int. Cl.
*A47L 1/02* (2006.01)

(52) U.S. Cl.
USPC ........................................ 134/56 R

(58) Field of Classification Search
USPC ................. 134/56 R, 113, 172, 181
See application file for complete search history.

(56) References Cited

U.S. PATENT DOCUMENTS

| | | | |
|---|---|---|---|
| 5,255,195 A * | 10/1993 | Mochizuki et al. | 701/23 |
| 2008/0308154 A1 * | 12/2008 | Cart et al. | 136/259 |
| 2009/0007901 A1 * | 1/2009 | Luconi et al. | 126/627 |
| 2010/0043779 A1 * | 2/2010 | Ingram | 126/694 |
| 2010/0058703 A1 * | 3/2010 | Werner et al. | 52/645 |
| 2010/0307566 A1 * | 12/2010 | Hinderling | 136/246 |

FOREIGN PATENT DOCUMENTS

| | | | |
|---|---|---|---|
| DE | 27 38 666 | * | 3/1979 |
| DE | 196 26 044 | * | 1/1998 |
| DE | 100 13 989 | * | 9/2001 |
| DE | 10 2004 036 094 | * | 2/2006 |
| DE | 202006020244 | * | 6/2008 |
| KR | 2002047446 | * | 6/2002 |
| KR | 2008013308 | * | 2/2008 |
| NL | 1020093 | * | 9/2003 |
| WO | WO 2011/106665 A2 | | 9/2011 |

* cited by examiner

*Primary Examiner* — Michael Barr
*Assistant Examiner* — Jason Riggleman
(74) *Attorney, Agent, or Firm* — Brooks Acordia IP Law, PC; Pejman Yedidson; Christopher Weiss

(57) ABSTRACT

Systems and methods of heliostat reflector cleaning via a vehicle in a heliostat field.

7 Claims, 16 Drawing Sheets

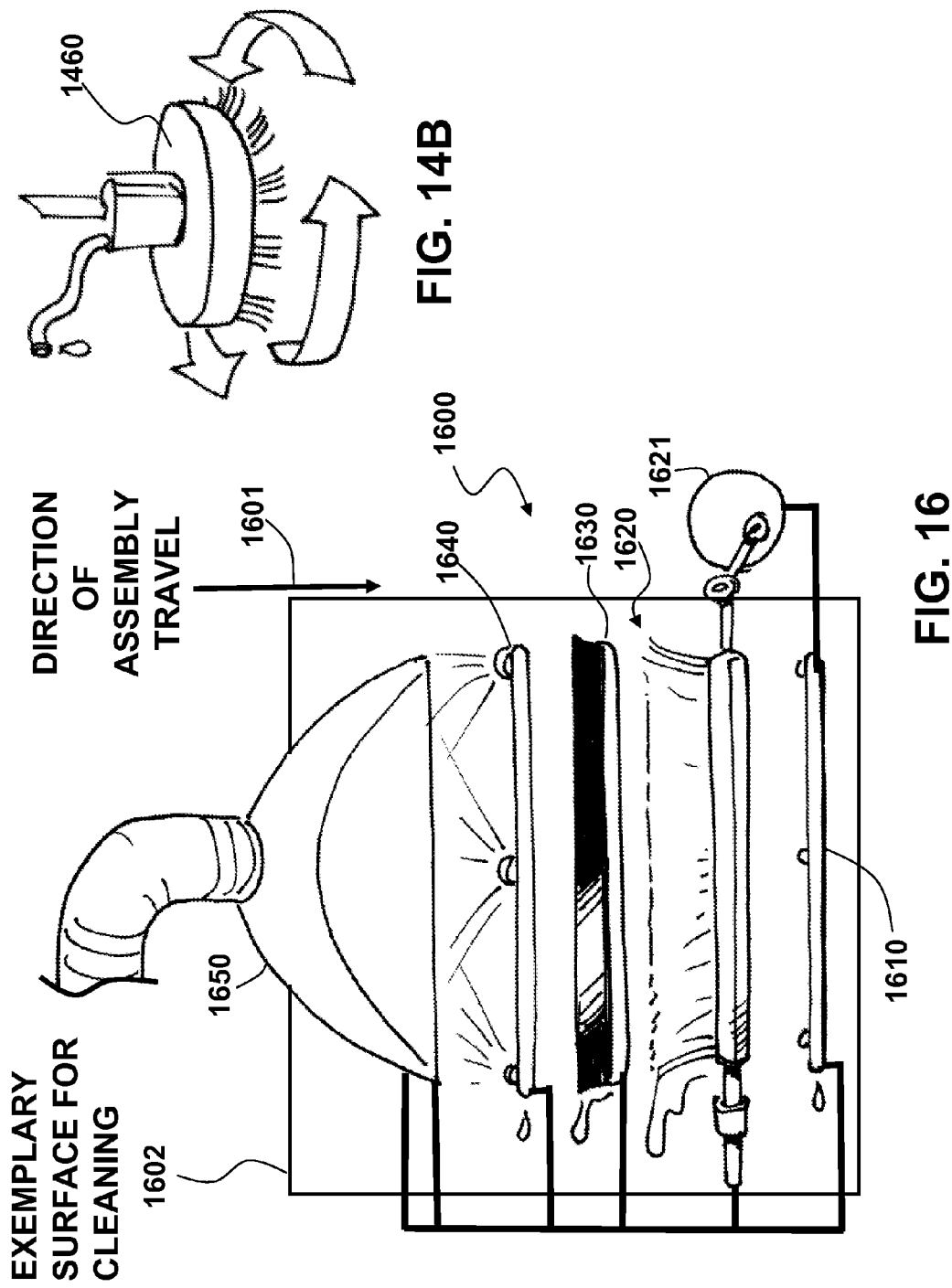

HELIOSTAT FIELD CLEANING SYSTEM

CROSS-REFERENCE TO RELATED APPLICATION

This application claims priority to and the benefit of U.S. Provisional Patent Application Ser. No. 61/207,629, filed Feb. 13, 2009, which is hereby incorporated herein by reference in its entirety for all purposes.

TECHNICAL FIELD

The present invention relates generally to heliostat maintenance, and more particularly to systems for and methods of heliostat cleaning and maintenance.

BACKGROUND

Heliostat reflectors may be cleaned by a directed water jet. A heliostat array field may consist of two or more linear or curvilinear arrays of heliostats.

SUMMARY

System, device and method embodiments of the present invention include a system comprising: (a) an array of a plurality of heliostats; (b) a cleaning vehicle configured to clean at least a portion of a reflector of a heliostat of the array of heliostats; and (c) a heliostat controller and motor assembly configured to reorient the heliostat reflector from a non-cleaning mode, e.g., a sun-tracking mode, to a cleaning mode, and responsive to at least one of: a command to reorient and a detected proximity of the cleaning vehicle to the heliostat. The cleaning vehicle of the exemplary system may be further configured to translate to a region proximate to a heliostat oriented for cleaning. The cleaning vehicle of the exemplary system may be further configured to detect a heliostat reflector misoriented for cleaning. The cleaning vehicle of the exemplary system may be further configured to clean at least a portion of a reflector of the proximate heliostat of the array via a cleaning end-effector, e.g., an element, such as an attachment that interacts with the environment and that may be disposed at the end of a robotic arm or having an intermediate disposition along the kinematical chain of links of a robotic arm, and where the cleaning vehicle may be further configured to reorient the cleaning end-effector responsive to a detected proximate next heliostat reflector misoriented for cleaning The cleaning vehicle of the exemplary system may be further configured to translate by retracing a path. The exemplary system may further comprise one or more arrays and wherein the cleaning vehicle may be further configured to be unidirectionally oriented for travel, and further configured to execute a U-turn at a detected end of at least one array and thereafter may re-enter the heliostat field at a next aisle to initiate cleaning an adjacent or proximate array or row of heliostats.

System embodiments may also comprise a curvilinear array of a plurality of heliostats; and a cleaning vehicle disposed proximate to the curvilinear array of a plurality of heliostats, each heliostat having a reflector surface, where the vehicle may be configured to position at least one end- effector, e.g., a cleaning fluid spray assembly, proximate to a reflector surface of a first heliostat of the first curvilinear array, and where the first heliostat is oriented for cleaning The vehicle may be further configured to translate, e.g., via a propulsion subsystem, to a second heliostat of the first curvilinear array, where the second heliostat may be oriented for cleaning according to the first heliostat cleaning orientation, i.e., the first heliostat reflector and second heliostat reflector may be substantially coplanar. The vehicle may be configured to detect whether the second heliostat is oriented for cleaning, e.g., via a tripped photogate. The vehicle may be further configured to optionally withdraw or retract the at least one end-effector, and to translate to a third heliostat of a first curvilinear array, based on a detected failed orientation of the second heliostat. The vehicle may be further configured to translate by retracing a curvilinear path, e.g., proximate to the curvilinear heliostat array and/or in an aisle between two curvilinear heliostat arrays. The system may comprise a plurality of curvilinear arrays where the vehicle may be further configured to be unidirectionally oriented, e.g., travel only forward, and further configured to execute a U-turn at a detected end of at least one curvilinear array, e.g., via differential drive wheel turns as commanded by an onboard computer.

An exemplary vehicle embodiment may comprise: (a) a chassis having a structure, motor, and drive assembly, where the drive assembly is configured, e.g., a drive wheel connected to the motor, to translate the vehicle in longitudinal direction in an aisle defined by an array of a plurality of heliostats, where the structure further comprises (a) an end-effector configured to clean at least a portion of a reflector of a proximate heliostat of the array of heliostats, where the vehicle is characterized by a vehicle travel region bordered by a perimeter defined by three or more distal portions of the vehicle in a planar longitudinal projection; and (b) a detector configured to sense an obstructing element oriented to extend into at least a portion of the vehicle travel region. Embodiments of the vehicle may be configured to reposition the end-effector responsive to a detected obstructing element. Embodiments of the vehicle may be configured to communicate their proximity to a heliostat controller. Embodiments of the vehicle may be further configured to translate by retracing a path. Embodiments of the vehicle may be further configured to be unidirectionally oriented for longitudinal travel and to execute a U-turn at a detected end of an aisle of at least one array of a heliostat field comprising two or more arrays, and to complete the U-turn at the beginning or threshold of a next heliostat array aisle.

Vehicle embodiments may comprise a cleaning vehicle configured to be disposed proximate to a first curvilinear array of a plurality of heliostats, each heliostat having a reflector surface, where the vehicle is configured to position at least one end-effector proximate to a reflector surface of a first heliostat of the first curvilinear array, and wherein the first heliostat is oriented for cleaning The vehicle may be further configured to translate to a second heliostat of the first curvilinear array, wherein the second heliostat is oriented for cleaning similar to the first heliostat cleaning orientation. The vehicle may be configured to detect whether the second heliostat is oriented for cleaning. The vehicle may clean at least a portion of the reflector of the second heliostat and then translate to a third heliostat and so on until the end of an array is reached. If a heliostat in the series to be cleaned fails to orient sufficiently for cleaning, the vehicle may detect the mis-oriented reflector and accommodate for the mis-orientation. For example, the vehicle may be further configured to translate to a third heliostat of the first curvilinear array, based on a detected failed orientation of the second heliostat. The vehicle may be further configured to withdraw or retract the at least one end-effector, e.g., a portion or all of an extended arm, and translate to a third heliostat of a first curvilinear array, based on a detected failed orientation of the second heliostat. The vehicle may be further configured to translate by retracing a curvilinear path. The vehicle may be further configured to be unidirectionally oriented and to execute a U-turn at a detected end of at least one curvilinear array of a field comprising one or more curvilinear arrays.

Method embodiments include a method of cleaning a heliostat array comprising: (a) providing a cleaning vehicle configured to autonomously travel along an aisle defined by the heliostat array; and (b) re-orienting, by a heliostat motor assembly responsive to a heliostat controller transmission, at least one heliostat reflector from a non-cleaning position, e.g., a sun-tracking position, into a cleaning position; where the heliostat control transmission is based on a proximity of the cleaning vehicle to the re-oriented heliostat reflector. The cleaning vehicle of the method embodiments may comprise a chassis and cleaning end-effector, e.g., a spray and/or brush assembly on an arm that may be controlled of otherwise positionable, and the cleaning vehicle may be characterized by an outer perimeter of the chassis and cleaning end-effector, where the outer perimeter defines a lateral plane of a cleaning vehicle volume, and the method may further comprise detection, by the cleaning vehicle, an obstruction in the lateral plane of the cleaning vehicle volume. In addition, method embodiments may further comprise temporarily reducing the lateral plane of the cleaning vehicle by moving the end-effector via, for example, a controlled arm to which it may be attached.

BRIEF DESCRIPTION OF DRAWINGS

The present invention is illustrated by way of example and not limitation in the figures of the accompanying drawings, and in which:

FIG. 14B depicts an optional rotating end-effector that may be mounted on the exemplary vehicle of FIG. 14A;

FIG. 16 depicts and exemplary end-cleaning assembly.

DETAILED DESCRIPTION

Figure 1:
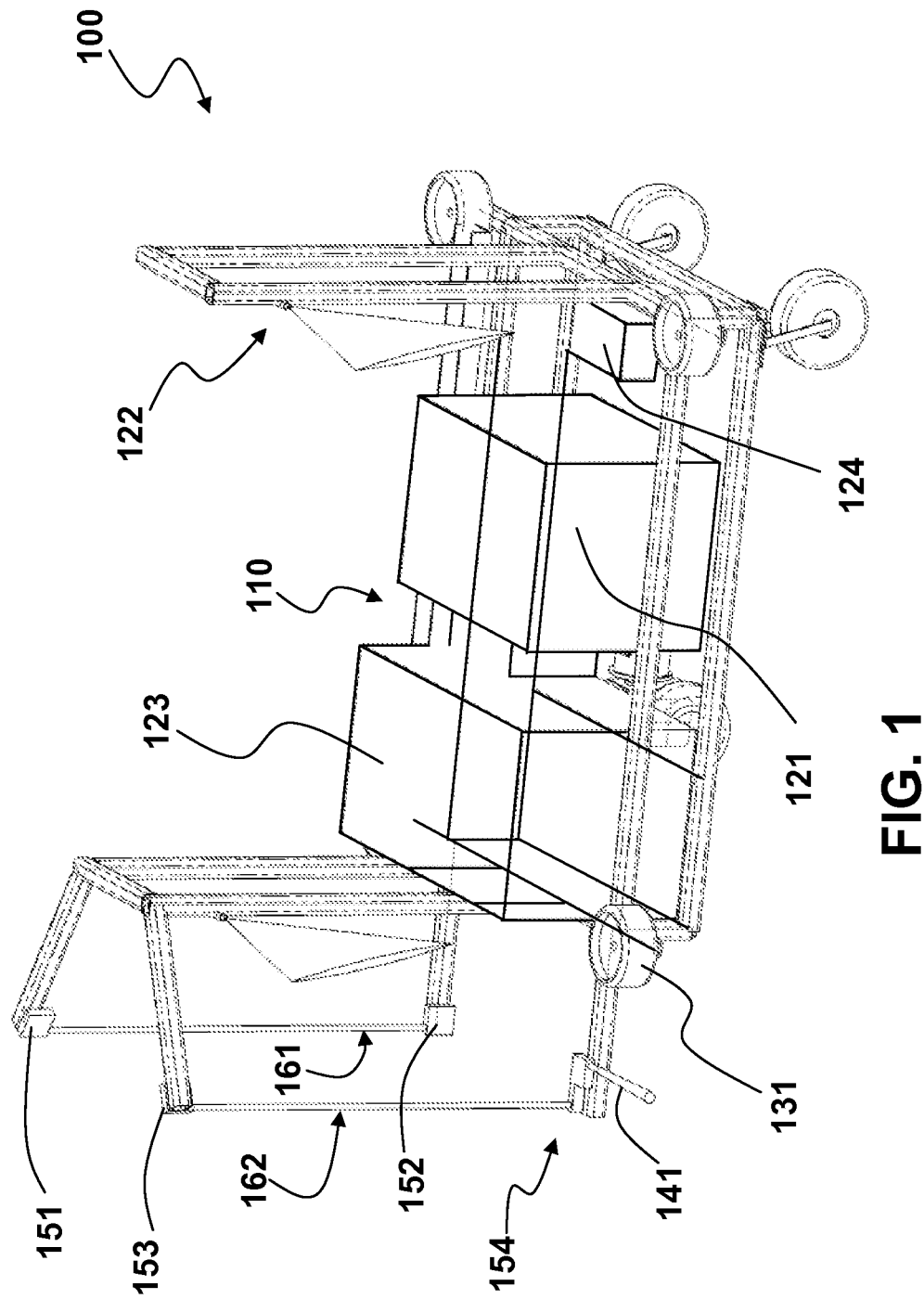
FIG. 1 is a depiction of an exemplary cleaning vehicle.

An exemplary cleaning vehicle 100 is depicted in FIG. 1. The exemplary vehicle comprises a processing module including a central processing unit and addressable memory and a communication link or bus for subsystem-to-subsystem and/or central processing-to-subsystem communication. Subsystems of the vehicle may be arranged as: (a) a propulsion subsystem comprising a motor with a speed controller and drive wheel 110 and may further comprise a power generator, e.g., an electrical power generation subsystem or based on other potential energy—whether stored in fuels such as gasoline or diesel, or chemical batteries; (b) a cleaning subsystem comprising a fluid pump 121 and including at least one nozzle 122 and a cleaning fluid source or reservoir 123 and may further comprise a high pressure pump 124 where supply lines may be disposed on or within structural elements of the vehicle; (c) a guidance system comprising a plurality of guide wheels 131 configured to engage a horizontal rail running the length of an aisle of heliostats. The processing module may be further configured to receive input from, and/or provide output to, a user via a human-machine interface (HMI). Also depicted in FIG. 1 is an end-of aisle-sensor 141. Exemplary embodiments of the electrical power generation subsystem of the vehicle may comprise a combustion engine, an alternator, a battery, and a voltage regulator. The engine is mechanically linked to the alternator which charges the battery and powers all electrical systems on the vehicle while the combustion engine is running When the combustion engine is not running, the battery may provide power to all electrical systems. The vehicle may further comprise a collision/heliostat warning system including collision sensors 151-154 that may be disposed on distal portions of structural members of the vehicle. In one embodiment, the collision/heliostat warning system's main sensor is a set of photogates, a first photogate set comprising a collector 151, and an emitter 152, and a second photogate set comprising a collector 153, and an emitter 154. When the beam 161, 162 of a photogate is broken by an object passing between the emitter 152 and collector 151, the output signal changes and the onboard computer is notified of an impending collision. The emitter and collector are both placed outside the possible range of motion of heliostats. Only the beam from the photogate passes through a volume of space in which a heliostat may be. Photogates are a non-contact detection method and represent an embodiment of the collision/heliostat warning system. In some embodiments of the collision/heliostat warning system, the main sensor may be a limit switch.

In some embodiments, the end-of-aisle-sensor 141 (FIG. 1) detects the end of a heliostat aisle and notifies the onboard computer. An exemplary embodiment of the end-of-aisle sensor 141 comprises a photogate configured with both a photo-emitter and a photo-collector. In some embodiments, the photo-emitter is aligned to direct its emission, in part, to the heliostat support structure, and a portion of the photo-emission may be reflected to the photo-collector of the sensor from the heliostat support structure. Upon the vehicle reaching the end of an aisle, the finite length heliostat support structure is no longer available to reflect the photo emissions, and the changed output from the photogate may be detected by processing of the onboard computer and the function of the notice of an end-of-aisle condition. The vehicle 100 may be further configured with a speedometer in a feedback loop with the speed controller, propulsion motor and the onboard computer or separate microcomputer. Accordingly, the speed controller may continually adjust the power to the propulsion motor to attain and thereafter retain the level of speed or lineal ground velocity requested by instructions executed by the onboard computer.

Figure 2:
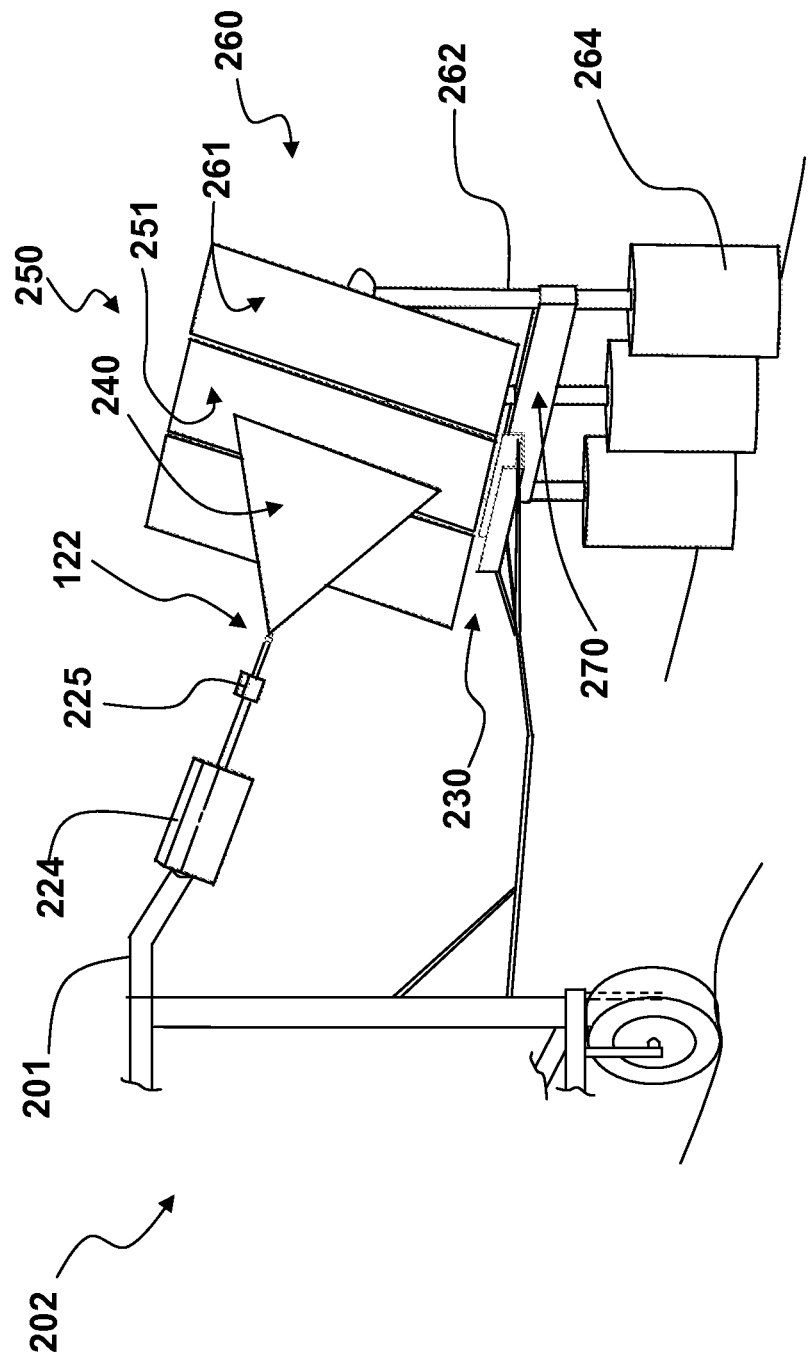
FIG. 2 is a depiction of a portion of an exemplary cleaning vehicle and a portion of a curvilinear heliostat array oriented for cleaning.
Figure 3:
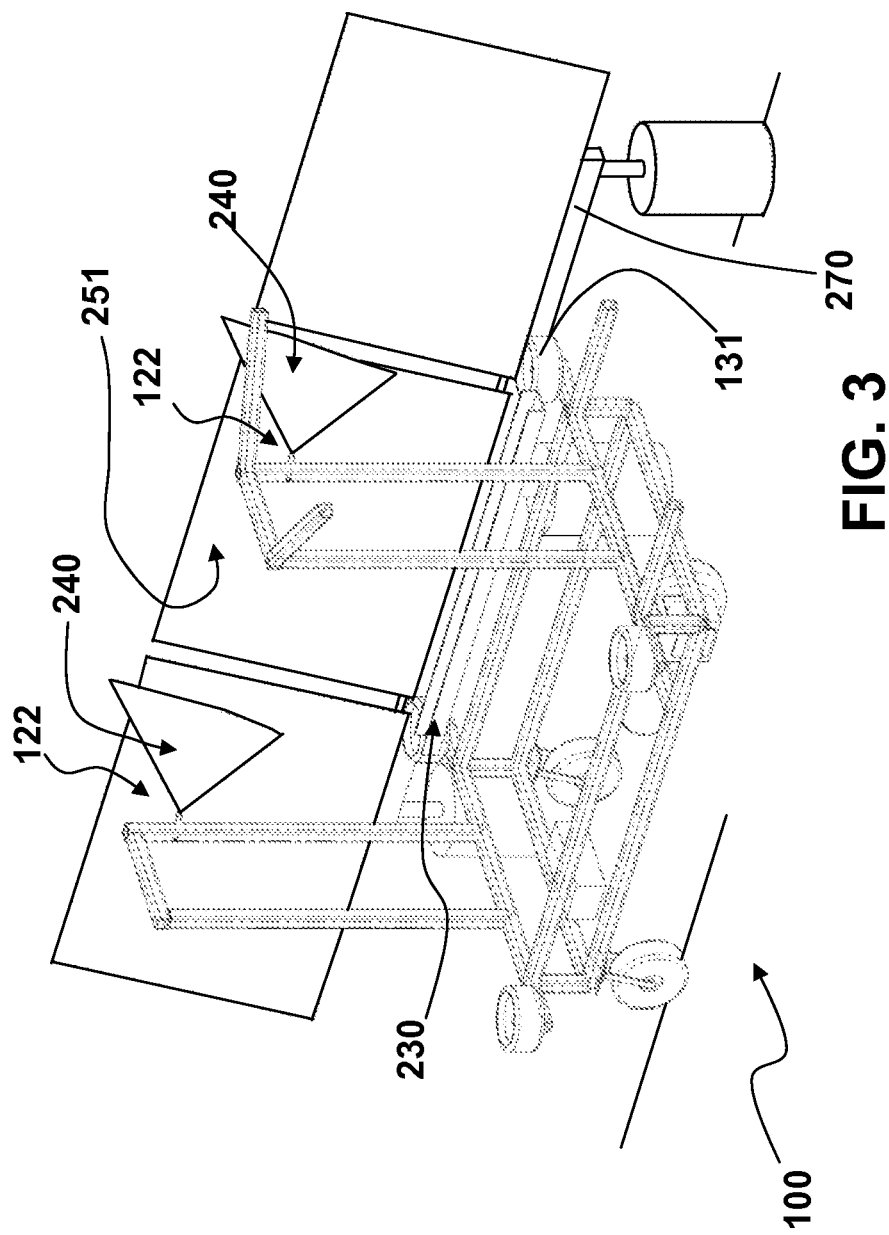
FIG. 3 is a depiction of a portion of an exemplary cleaning vehicle and a portion of a curvilinear heliostat array oriented for cleaning.

Reference is made to FIG. 2, where, in some embodiments, a portion of the cleaning subsystem may be disposed on an arm 201 of the vehicle 202 and the portion of the cleaning subsystem may comprise a high pressure pump 224, a valve 225, e.g., an electrically-activated valve, a flow-directing element, e.g., a nozzle 122. A heliostat 260 may comprise a reflector 261 rotatably attached to a pedestal 262 by an controlled joint, for example a two-axis drive assembly such as a pair of stepper motors providing tilt-tilt, in which the reflector is configured to pivot about two orthogonal axes in a substantially horizontal plane, or azimuth-elevation orientations, in which the reflector is configured to pivot about a substantially horizontal axis and a substantially vertical axis, and where the pedestal may be mounted on a base 264. A first heliostat 260 may be joined to a second heliostat 250 by a heliostat support structure 270, e.g., a horizontal rail. As part of exemplary fluid recovery system, a gutter 230 may be disposed on the cleaning vehicle, traversing the array with the vehicle and positioned so as to be sufficiently proximate to a heliostat reflector 251 so as to capture fluid runoff. For example, a cleanliness sensor may be applied to indirectly measure the cleanliness of mirrors by capturing the runoff from the heliostats and analyzing its composition. Based on the amount of solids dissolved and in suspension, the cleanliness of the mirrors prior to cleaning may be determined. This runoff fluid may also be purified and recycled in the cleaning system. The recovered fluid may be transported via ducting to a fluid analysis system that may be onboard the vehicle or external to the vehicle. One or more spray nozzles 122 may be mounted to the cleaning vehicle 100 as depicted in FIG. 3, and a fluid jet 240 from the one or more nozzles may accordingly be directed toward a heliostat mirror of a plurality of heliostat mirrors. FIG. 3 also depicts a mechanical guidance system comprising a guide wheel 131 and a portion of the heliostat support structure 270. A gutter 230 may be disposed along the length of the cleaning vehicle, traversing the array with the vehicle and positioned so as to be sufficiently proximate to a heliostat reflector 251 so as to capture fluid runoff.

Figure 4:
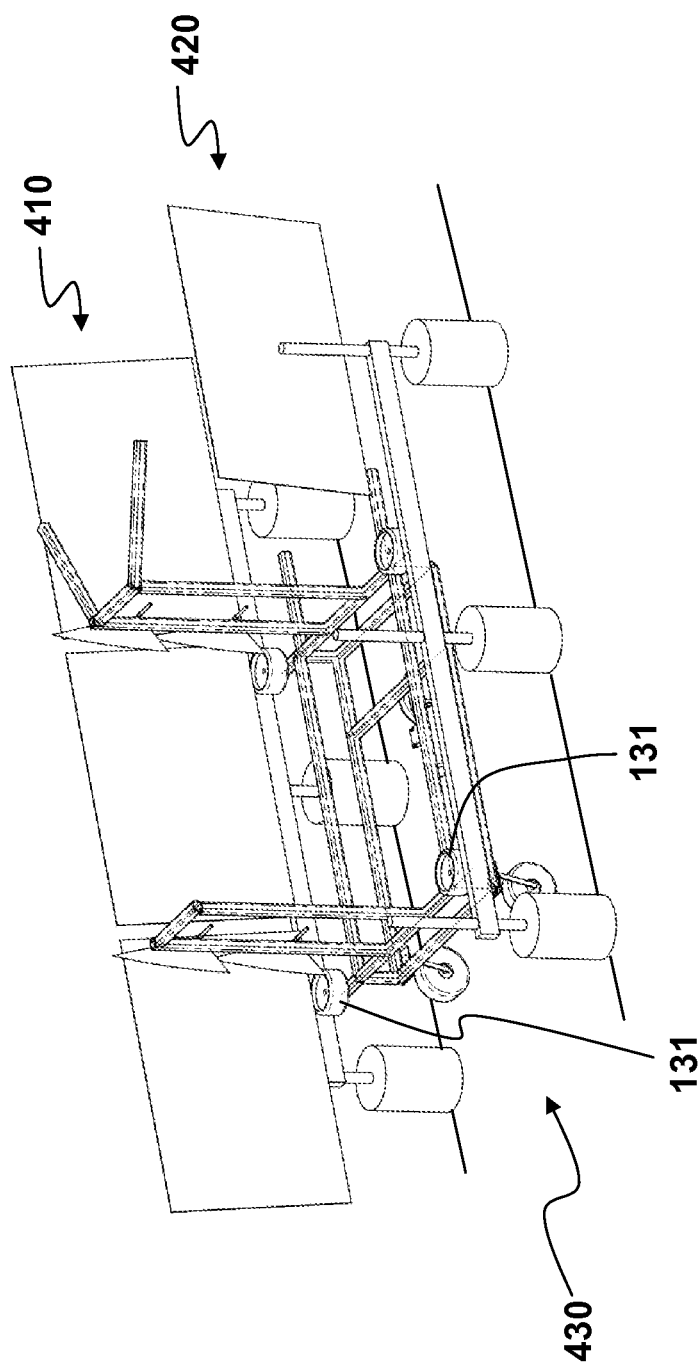
FIG. 4 is a depiction of an exemplary cleaning vehicle and a portion of a curvilinear heliostat array oriented for cleaning.

The guidance system may be further broken down into a mechanical guidance system and an electrical guidance system. In an exemplary embodiment depicted in FIG. 4, the mechanical guidance system comprises a guide wheel 131 and a portion of a heliostat support structure of a first curvilinear array of heliostats 410 and a second curvilinear array of heliostats 420 comprising the exemplary heliostat field. Accordingly, an aisle or pathway 430 is interposed between the first curvilinear array of heliostats 410 and the second curvilinear array of heliostats 420.

Figure 5:
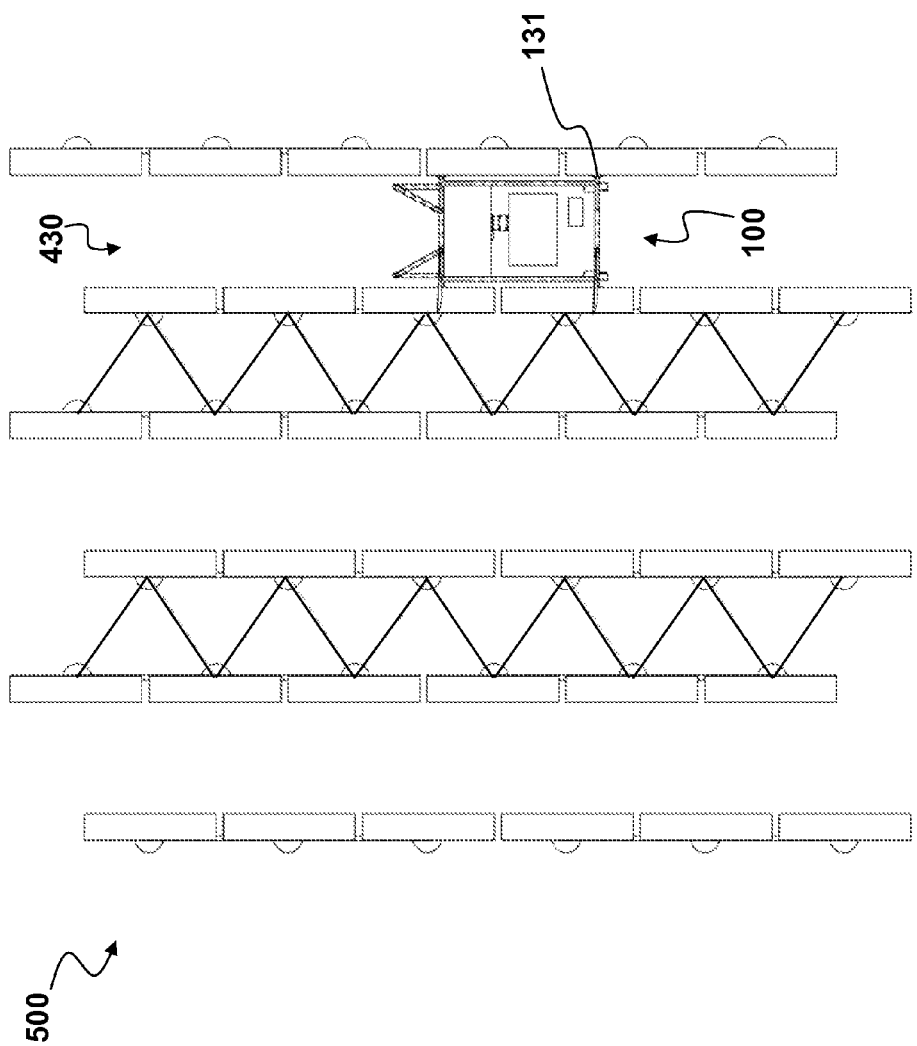
FIG. 5 is a top view depiction of an exemplary cleaning vehicle and an exemplary portion of a curvilinear heliostat field.

FIG. 5 depicts a top view of a plurality of curvilinear heliostat arrays 500, i.e., a heliostat field, where in an aisle or pathway 430, a vehicle 100 is shown disposed. The vehicle 100, once in an aisle 430 is depicted as constrained by a guide wheel 131 to forward and aft directions of movement. Accordingly, as the vehicle 100 translates forward or aftward, the vehicle remains centered in, and aligned parallel to the aisle 430. The heliostat field depicted in FIG. 5 has a regularity of arranged curvilinear heliostat arrays that is conducive to simplifying the automation of a heliostat cleaning vehicle.

Figure 6:
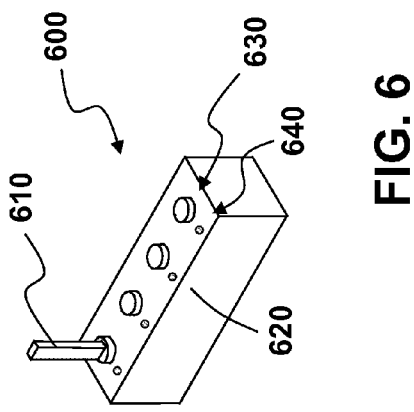
FIG. 6 is an exemplary vehicle user controller interface.

FIG. 6 depicts in a perspective view, an exemplary user or human interfacing device 600 that may comprise a radio frequency (RF) antenna 610, and an RF transceiver and antenna within a housing 620, where the housing further comprises an input element array such as a row of buttons 630 and a row of indicator lights 640. The human interfacing device 600 may be configured so that the depressing, and/or holding of different combinations of buttons 630 may be processed by the interface processing to generate and transmit signals to an onboard vehicle transceiver in communication with the onboard computer. Accordingly, the user may effect a change in the state of the cleaning vehicle, causing for example: forward motion, reverse motion, and nozzle activation/deactivation. In addition, some embodiments of the vehicle may include a mast that rises above the height of the mirror field comprising a plurality of curvilinear heliostat arrays, where the mast comprises lights driven by one or more signals initiating from the onboard computer to visually notify the operator as to the state of the vehicle and/or a loudspeaker driven by one or more signals initiating from the onboard computer to audibly notify the operator as to the state of the vehicle.

Figure 7:
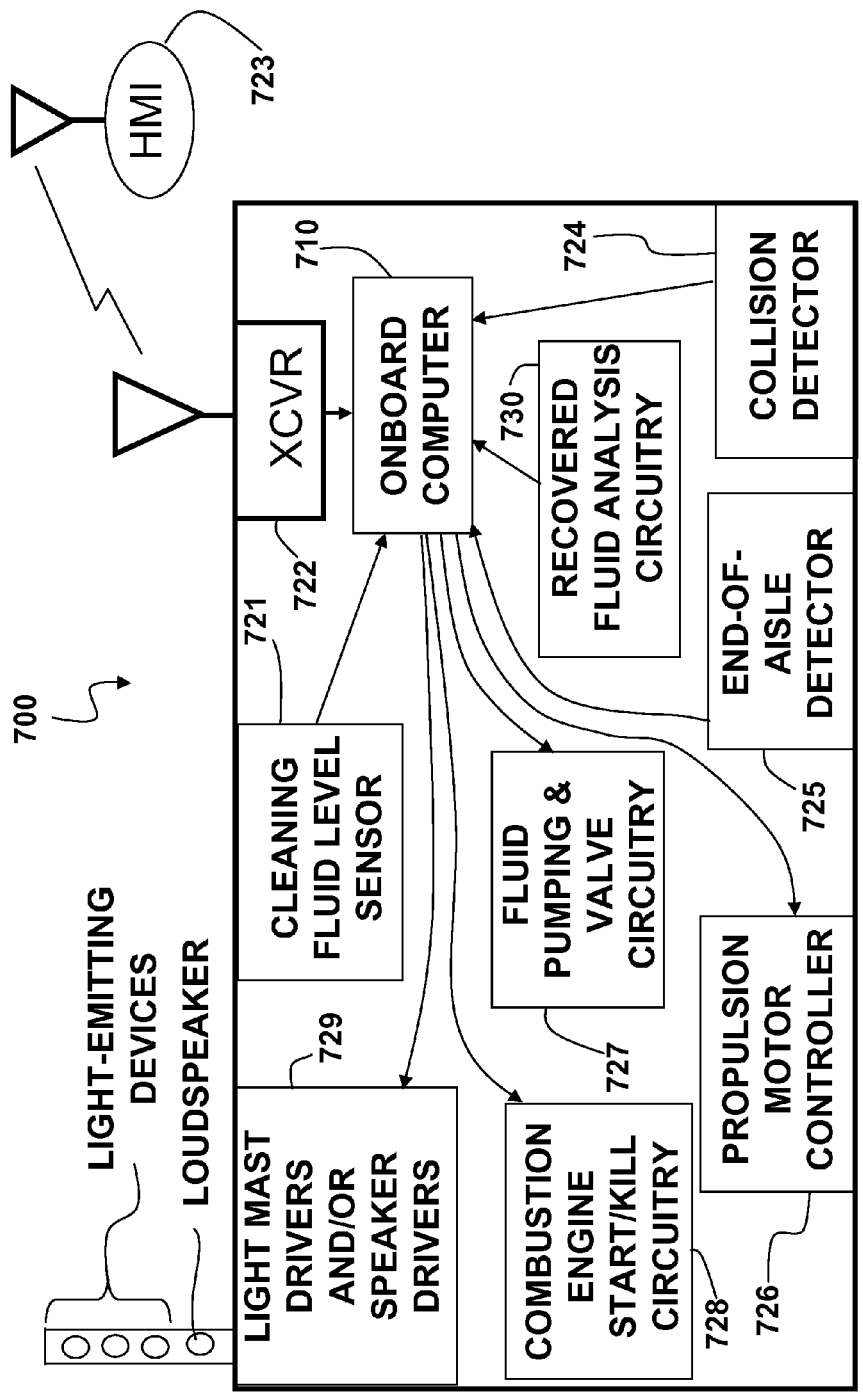
FIG. 7 is an exemplary functional block diagram of a vehicle signal processing embodiment.

FIG. 7 is a functional block diagram depicting subsystems, circuitry, processing units, and other exemplary modules that may be configured to perform the functions of a cleaning vehicle embodiment 700 and configure the vehicle as a self-navigating vehicle. In this example, the onboard computer 710 receives inputs, individually or via one or more bus lines, from the onboard sensors. The onboard computer 710 may be implemented via computer-readable instructions and/or computer-executed instructions in part as a state machine, i.e., configured to produce pre-programmed outputs for every combination and order of inputs. The inputs to the onboard computer may comprise inputs from the cleaning fluid level sensor 721, the various human interface buttons 722, 723, a collision/heliostat warning system 724, a fluid analysis subsystem 730 for determining whether the re-circulated fluid is clean enough or otherwise suitable to wash heliostats, and an end of aisle detector 725. The onboard computer may execute instructions based on input from a guidance subsystem. The onboard computer may output control signals to effect the speed and direction changes in the vehicle via output to the propulsion motor controller 726 and the state of the controlled, e.g., electrically controlled or pneumatically controlled, one or more valves 727. The onboard computer may output control signals to effect a combustion engine start or kill switch 728, and may output control signals to effect light emitting device drivers 729 for an attached light mast. Accordingly, the cleaning vehicle may determine its position according to GPS-related coordinates and/or determine its position relative to a heliostat of the one or more arrays of heliostats, and thereby self-navigate and aisle.

Figure 8:
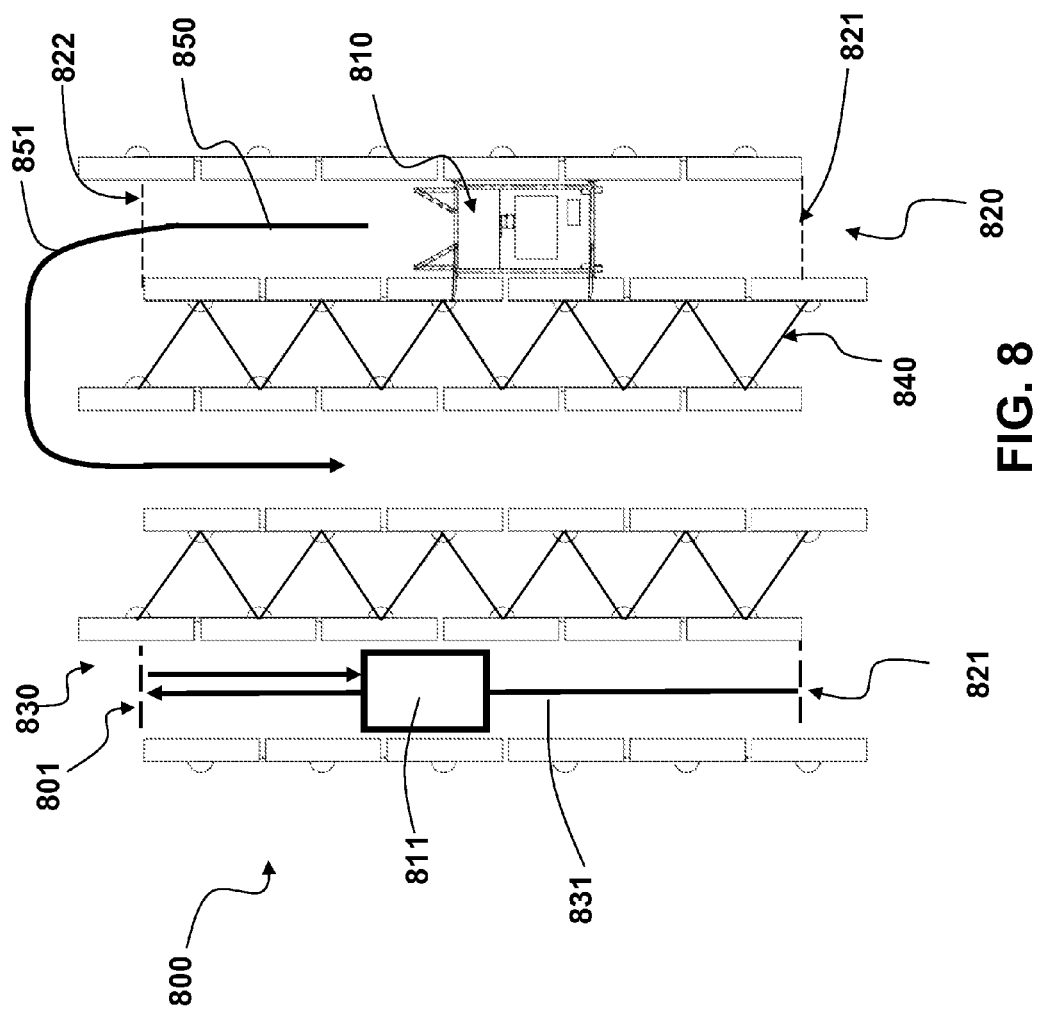
FIG. 8 is a top view depiction of an exemplary cleaning vehicle and exemplary paths in an exemplary portion of a curvilinear heliostat field.

FIG. 8 depicts in a top view a cleaning vehicle 810 in a first aisle 820 of an array field 800. Some embodiments of the vehicle 810 are configured to enter the edge of the field 821 with guidance from an operator, and thereafter navigate through the field and back out of the field before requiring additional operator input. FIG. 8 depicts two exemplary path generalizations that may accomplish the cleaning of one or more curvilinear arrays, including arrays of linear arrays and/or arcuate arrays, of heliostats of the array field. One exemplary path has the vehicle control system configured to reverse the vehicle direction of motion at the end of an aisle 801, and thereafter, absent user input, the vehicle 811 remains in the aisle into which it was introduced—a path 831 depicted in a second aisle 830. Another exemplary path 850 includes the vehicle 810 configured to navigate a turn 851 into a different or neighboring aisle 840, a turn that may be initiation upon a detection of reaching the end of an aisle 822. The turn may be aided by half-width offsets of each array relative to the next. Accordingly, the structure and planform of the heliostat field may further aid in controlling the position of the vehicle. An exemplary heliostat array and field is taught in U.S. patent application Ser. No. 12/136,001, filed Jun. 9, 2008 and published Jan. 8, 2009 as U.S. publication no. 2009/0007901A1, of which FIGS. 1-41 and 46-50 and paragraphs 57-94 and 97-100, are hereby incorporated by reference herein.

In some embodiments, the cleaning system for a heliostat field comprises a plurality of cleaning vehicles. The deployment of two or more cleaning vehicles enables a single cleaning operator to supervise multiple vehicles simultaneously thereby reducing the amount of time required to clean a field without increasing the number of man hours required.

The amount of cleaning fluid and the pressure at which it is dispensed affects the maximum cleanliness available via a nozzle. In one embodiment, the vehicle uses an adaptive cleaning method whereby the amount of cleaning dispensed is adjusted based on either the measured cleanliness of a mirror or the dirtiness of a mirror prior to cleaning. The dirtiness prior to cleaning may be measured via an analysis of the runoff water where the runoff may be gathered by the gutter of FIG. 2.

Figure 9B:
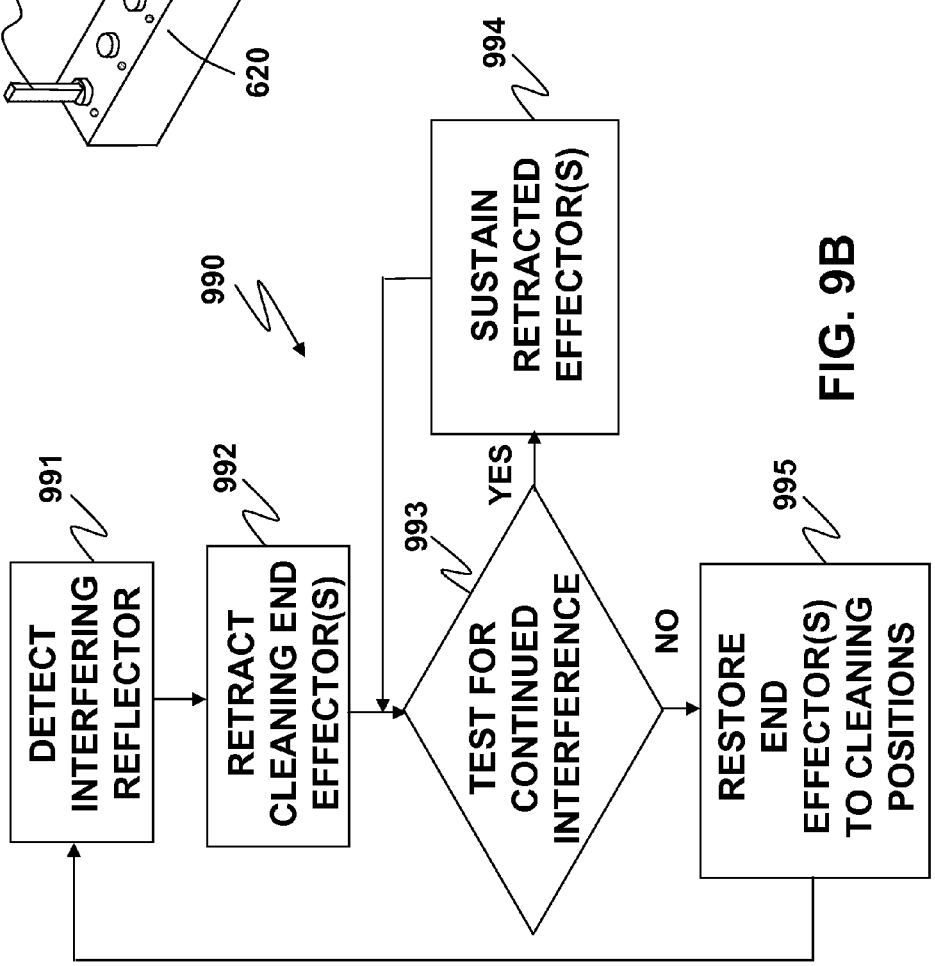
FIG. 9B is a top-level flow chart of the exemplary testing for obstructions and repositions of end-effectors.
Figure 9A:
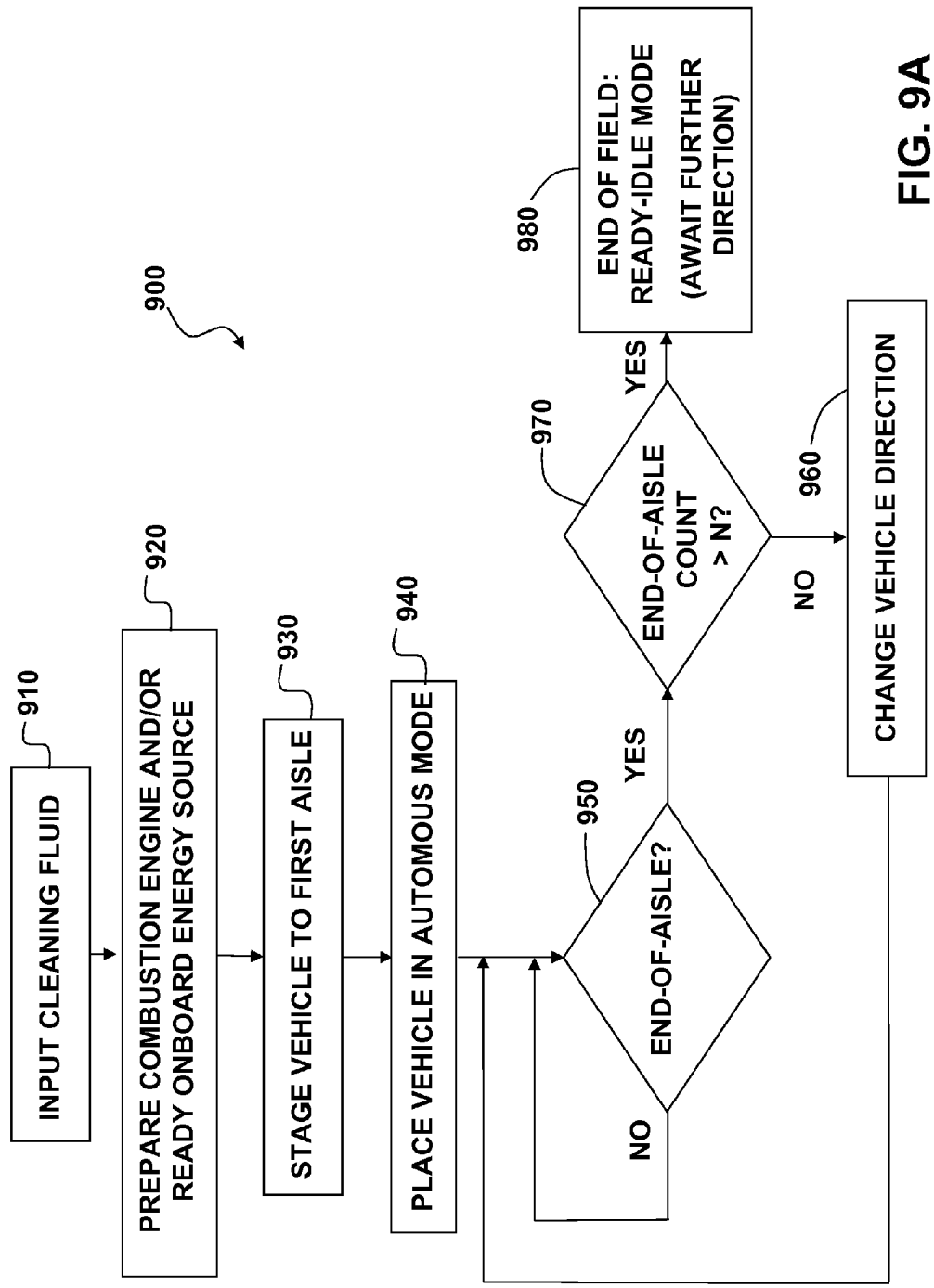
FIG. 9A is a top-level flow chart of the exemplary use of a system embodiment of the present invention.

FIG. 9A is a top level flowchart 900 which illustrates an exemplary operational methodology for the system based on one or more cleaning vehicle embodiments. The cleaning fluid reservoir of the cleaning vehicle is filled with cleaning fluid (step 910). The fuel supply and readiness of the combustion engine is checked and/or the onboard energy source is readied (step 920), e.g., the gasoline level and oil level of a gasoline engine may be checked. The operator engages the cleaning vehicle via the user interface and starts the vehicle in its first aisle (step 930), and places the vehicle in an autonomous cleaning mode, i.e., the vehicle begins spraying and vehicle translation (step 940). The vehicle tests for end-of-aisle (test 950) and, when detected, the vehicle tests for edge/end of the array field (test 970), e.g., based on the quantity of detected end-of-aisles detected, and if at edge of field, then the onboard computer of the vehicle may transition into a ready-idle mode (step 980) waiting for further operator instructions. Otherwise, if the vehicle detects the end-of-aisle, the vehicle changes direction (step 960), e.g., either by reversing course or by executing a turn into a neighboring aisle. Embodiments of the automated system comprising the heliostat array and cleaning vehicle do not necessarily require lighting, and accordingly cleaning may be accomplished at night by the vehicle. FIG. 9B illustrates a process 990 of a cleaning system capable of not only detecting when reflectors fail to enter cleaning mode, but also capable of avoiding them. The heliostat detection method could be any type of range-finding method, e.g., sonar, time-of-flight laser. The cleaning vehicle processing may detect an interfering reflector (step 991) and the retracting of the one or more end-effectors (step 992). The processing may test for continued interference (test 993) and either sustains refractor effectors (step 994) or restores end-effectors to cleaning positions (step 995).

Figure 10:
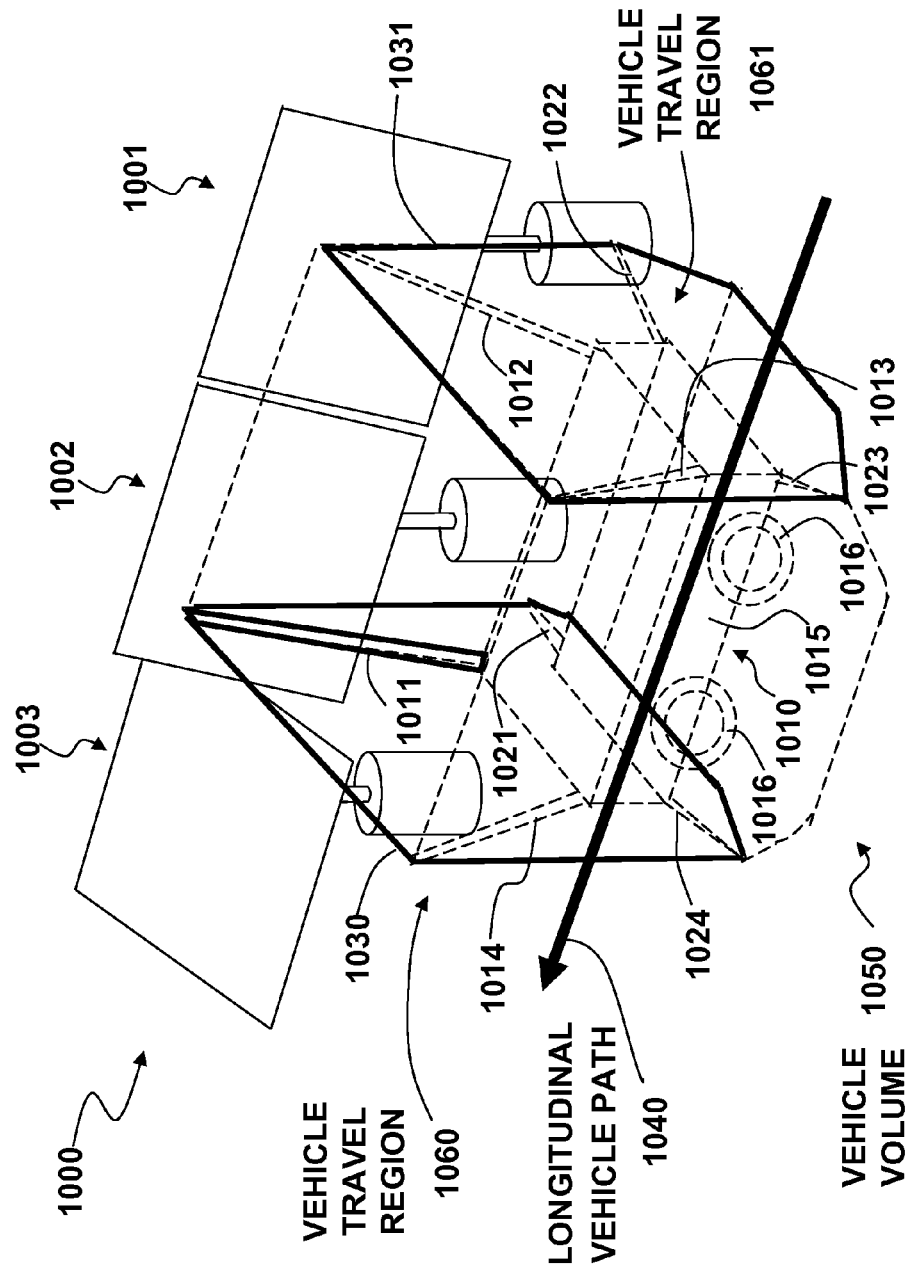
FIG. 10 is a depiction of a portion of a curvilinear heliostat array oriented for cleaning and an exemplary ill-positioned heliostat reflector

FIG. 10 depicts a curvilinear array of heliostats 1000 where the heliostat reflectors of FIG. 5 may be positioned into a coplanar arrangement. Accordingly, a first heliostat 1001 and a second heliostat 1002 have been positioned, e.g., via pedestal-mounted, two-axis stepper motors, to be slightly inclined for cleaning fluid runoff and avoid tripping the beam 161, 162 of a photogate (FIG. 1) of the vehicle or to avoid being mechanically contacted by booms or brush-based contact sensors. Moreover, the heliostat reflectors may be positioned coplanar to one another. The coplanar arrangement and inclination may aid the precision with which a water jet may be directed from a nozzle as depicted in FIG. 2. A third heliostat 1003 is shown greatly inclined relative to the first and second heliostats to illustrate a failure in positioning by its motor assembly or other faults such as a broken communication link. The cleaning vehicle 1010 may be characterized as having a local longitudinal path 1040. The exemplary vehicle 1010 may comprise upper arms 1011-1014 for end-effectors extending from a chassis 1015, where one or more wheels are connected to the chassis 1015, and the exemplary vehicle 1010 may comprise lower arms 1021-1024 for supporting, for example, fluid recycling troughs. A perimeter 1030, 1031 defined by three or more distal portions of the vehicle in a planar longitudinal projection defines a vehicle travel region 1060, 1061 of a vehicle volume 1050 along its longitudinal axis. For example, distal portions of upper arms 1011-1014, lower arms 1021-1024, and the wheels 1016, and lines connecting the portions, define a vehicle travel region in a planar longitudinal projection. Put another way, a plane of the vehicle volume 1050 orthogonal to the longitudinal vehicle path 1040 may contain vehicle travel region 1060, 1061 defined by the outer perimeter comprising distal points or portions of the vehicle.. A vehicle travel region is a region within which an obstruction, such as a misoriented reflector array may be detected by one or more vehicle sensors and/or may impede the travel of the cleaning vehicle—unless the vehicle reverses course or reconfigures itself. Also shown in FIG. 10 is an upper arm 1011 that may collide with the third reflector 1003 if the vehicle 1010 continues to travel along the longitudinal vehicle volume. Accordingly, a cleaning vehicle may self-reconfigure so that by moving an end-effector, e.g., upper arm 1011 or upper arm 1012 may comprise an end-effector, the region of the vehicle travel plane is sufficiently reduced or altered to allow the cleaning vehicle to travel past the misoriented reflector. That is, the vehicle may accommodate the ill-positioned heliostat 1003, by detecting the obstruction via a photogate or other sensors, and by moving the onboard end-effector—or other moveable member of the structure such as an arm—to clear the obstruction. In addition, the heliostat cleaning vehicle may then move through an aisle (FIGS. 5 and 8) and clean each heliostat reflector without the operator individually positioning the heliostat and without the cleaning vehicle repositioning its cleaning mechanism.

Figure 11:
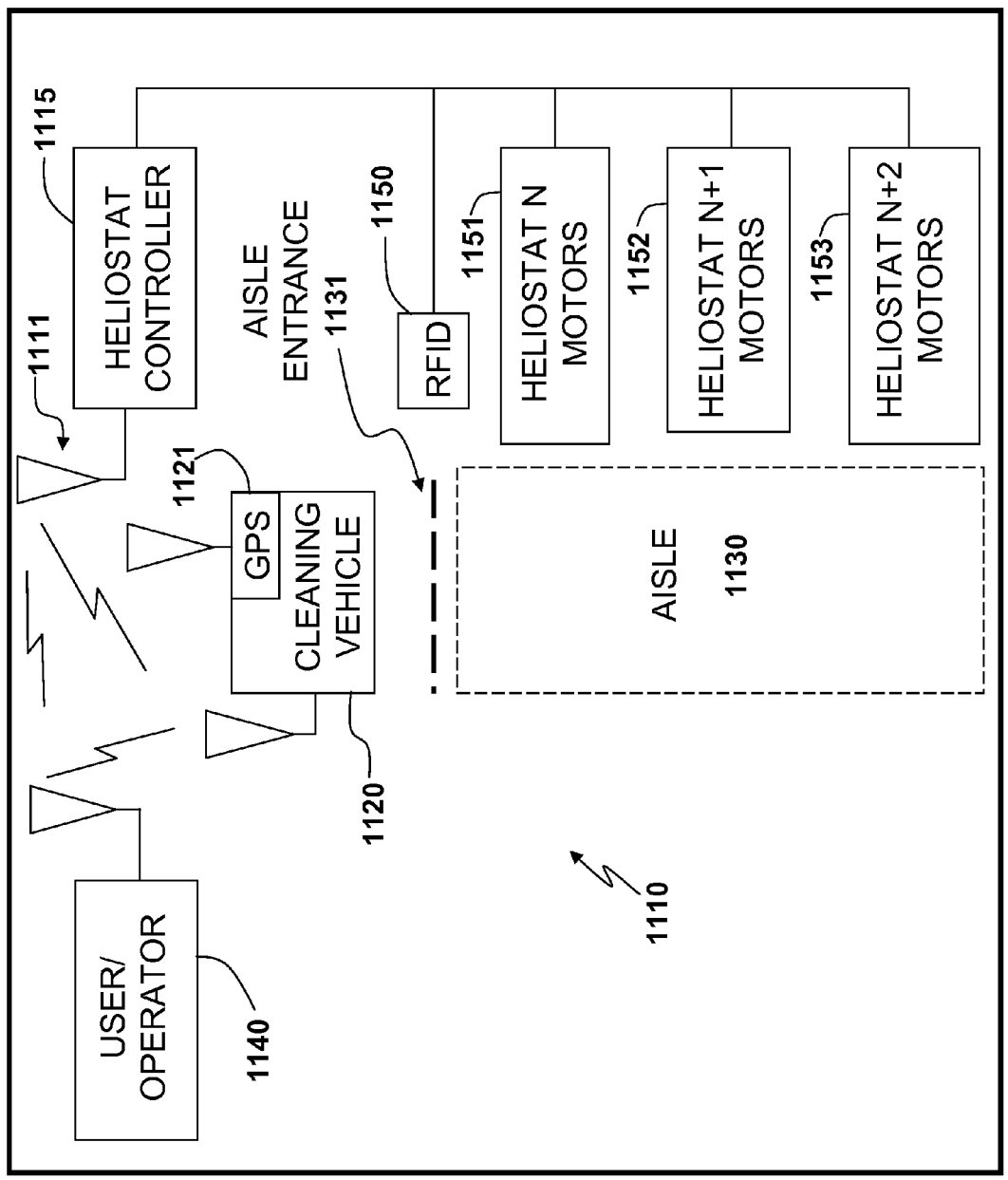
FIG. 11 is a top-level functional block diagram of a vehicle-operator-heliostat system.

The functional block diagram 1110 of FIG. 11 depicts a heliostat field controller 1115 that may be configured, e.g., via a radio frequency (RF) link 1111, to receive location information pertaining to one or more cleaning vehicles 1120. When a cleaning vehicle 1120 is positioned proximate to an aisle entrance 1131 for cleaning reflectors of a heliostat array, the heliostat field controller 1115 may receive the cleaning vehicle 1120 position information, direct the affected array to orient for cleaning, and may generate a cleaning initiation command to the positioned cleaning vehicle 1120. The communication channels between any combination of operator 1140, heliostat controller 1115, and cleaning vehicle 1120 may be wireless, e.g., radio frequency links. Vehicle position information may be provided to the heliostat field controller via a radio link onboard the positioned cleaning vehicle. The vehicle 1120 may carry an element responsive to an RFID emitter 1150 and the vehicle position information may be provided to the heliostat field controller via an RFID device 1150 disposed in the heliostat field proximate to the aisle entrance 1131. Vehicle position information may be determined via a GPS receiver 1121 onboard the vehicle and transmitted via a radio link to the heliostat field controller 1115. Embodiments of the heliostat field may include a bar code reader in communication with the heliostat controller, and the cleaning vehicle may have disposed on its outer chassis region a bar code identifying it as a cleaning vehicle and thereby prompt the heliostat controller 1115 to command re-orientation of the proximate heliostats, e.g., heliostats N through N+2, defining the aisle 1130, via signals to the associated heliostat motors 1151-1153.

Continuing with FIG. 11, a heliostat field controller 1115 may be configured to receive a command signal of a user 1140 transmission, e.g., an RF transmission, to direct one or more designated arrays of heliostats to orient for cleaning The same user transmission, or a different user transmission, may include a command signal to a cleaning vehicle to move proximate to an aisle entrance 1131 corresponding to the array oriented for cleaning. The responsive and positioned vehicle 1120 may start cleaning based on its own self-check, or after receiving a start command of a user 1140 transmission, or based on a start command of a heliostat field controller 1115 transmission.

Figure 12:
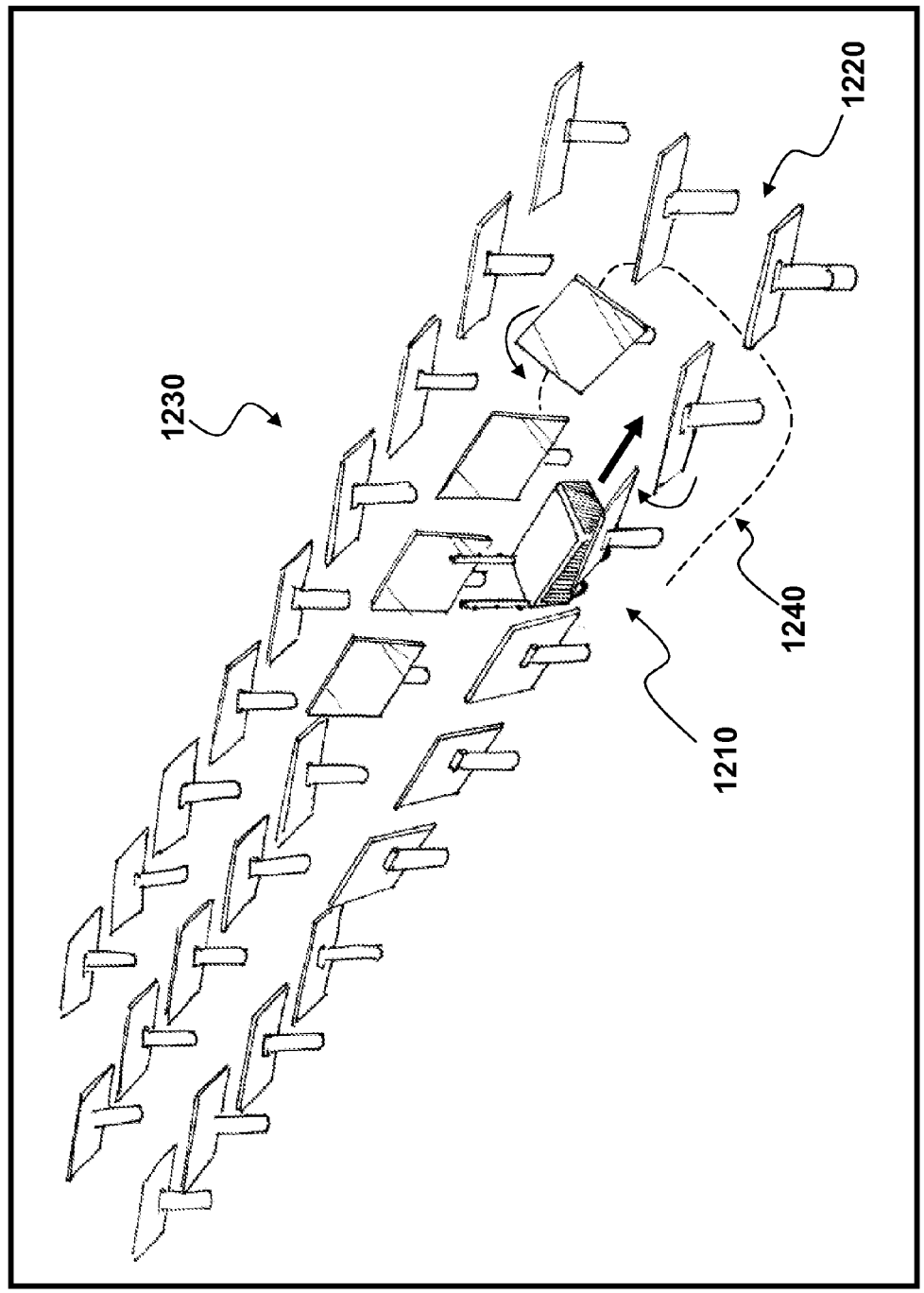
FIG. 12 is a depiction of an exemplary cleaning vehicle traversing an aisle of an exemplary field of heliostats.

FIG. 12 depicts a cleaning vehicle embodiment 1210 moving down an aisle 1220 of heliostats of a field 1230 of heliostats. The exemplary cleaning vehicle 1210 is configured to communicate with the field 1230 in such a way, e.g., FIG. 11, that heliostats, via motor assemblies and a central heliostat controller or distributed heliostat controllers, do not move into cleaning position until the vehicle is sufficiently proximate 1240 for initiating local cleaning. Once positioned and made proximate, the opposing heliostat reflectors are cleaned, and then they may return to an orientation supportive of their function prior to positioning for cleaning. In this manner, the system may be operated during the daytime, and even during multiple heliostat tracking by the field. The command to enter cleaning mode may originate from various entities including: the cleaning operator, the cleaning vehicle itself, and the field noticing the cleaning vehicle. Accordingly, the heliostats may individually, or a group, may sense or otherwise detect the cleaning vehicle, or the heliostat controller, or an operator may command one or more of the heliostats to move, i.e., re-orient, to a cleaning position. Illustrated in FIG. 12 is an upright reflector cleaning position with aisles wide enough for the cleaning vehicle to make it down the aisle. After the vehicle 1210 clears the movement volume of the heliostat, the cleaned heliostats may return to their respective operational mode prior to cleaning, such as tracking Accordingly, heliostat cleaning may occur during the day with minimal impact to the efficiency of the associated power plant.

Figure 13:
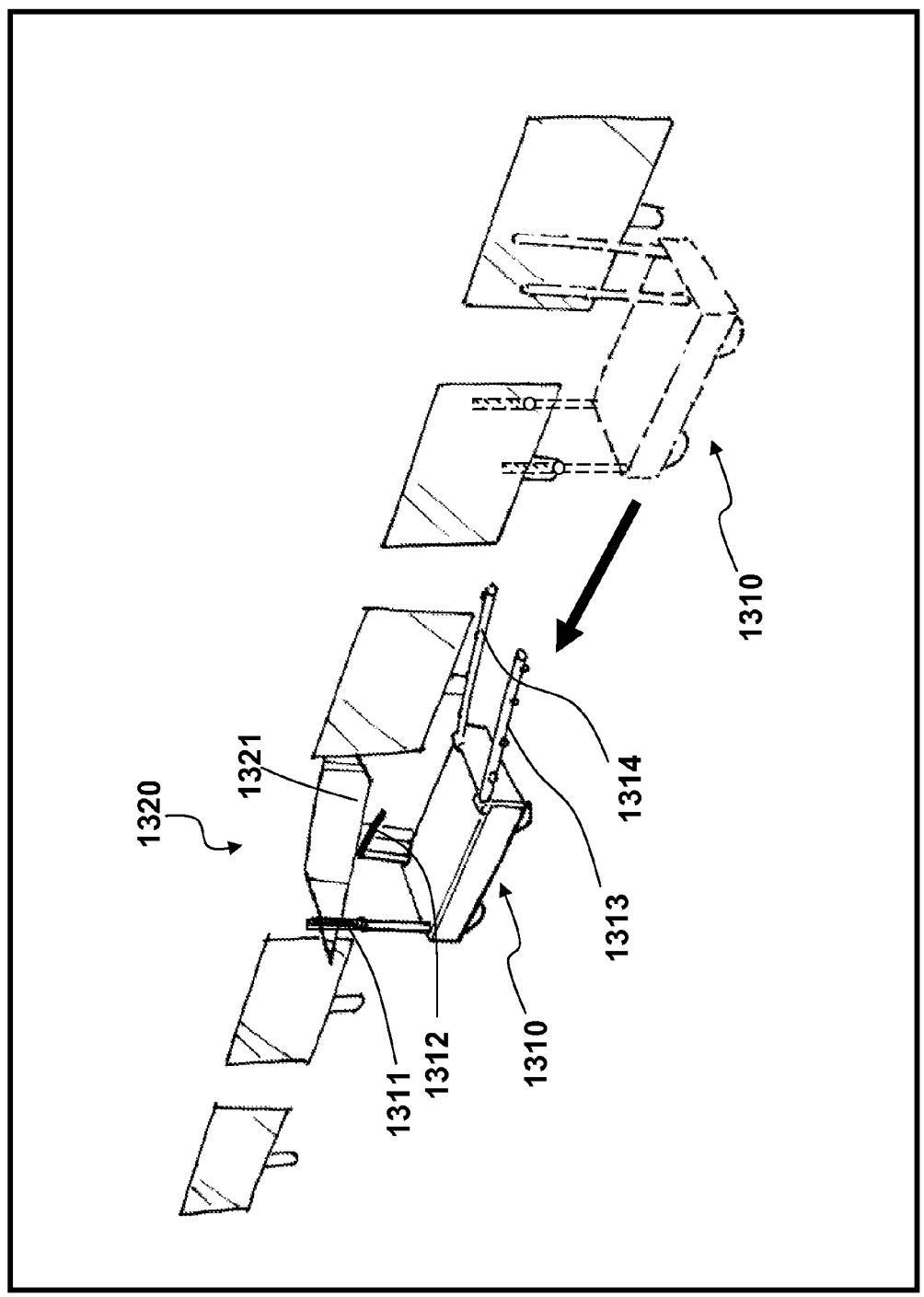
FIG. 13 a cleaning vehicle configured to detect and reposition end-effectors responsive to detect obstruction.

FIG. 13 depicts a cleaning vehicle embodiment 1310 that senses via booms 1311,1312, particularly in this example its right boom 1312, that a reflector of a heliostat 1320 having a faulty positioning motor, is extending into the lateral volume of the chassis and end-effectors 1313, 1314 of the vehicle 1310. The vehicle may lower both end-effectors 1313, 1314 or just the right end-effector 1314 as it travels the aisle so as not to contact, or otherwise interfere with, the reflector 1321. Once the lateral volume of the vehicle 1310 clears the faulty heliostat 1320, the vehicle may raise the previously lowered one or both exemplary end-effectors 1313, 1314 and then continue cleaning.

Figure 14A:
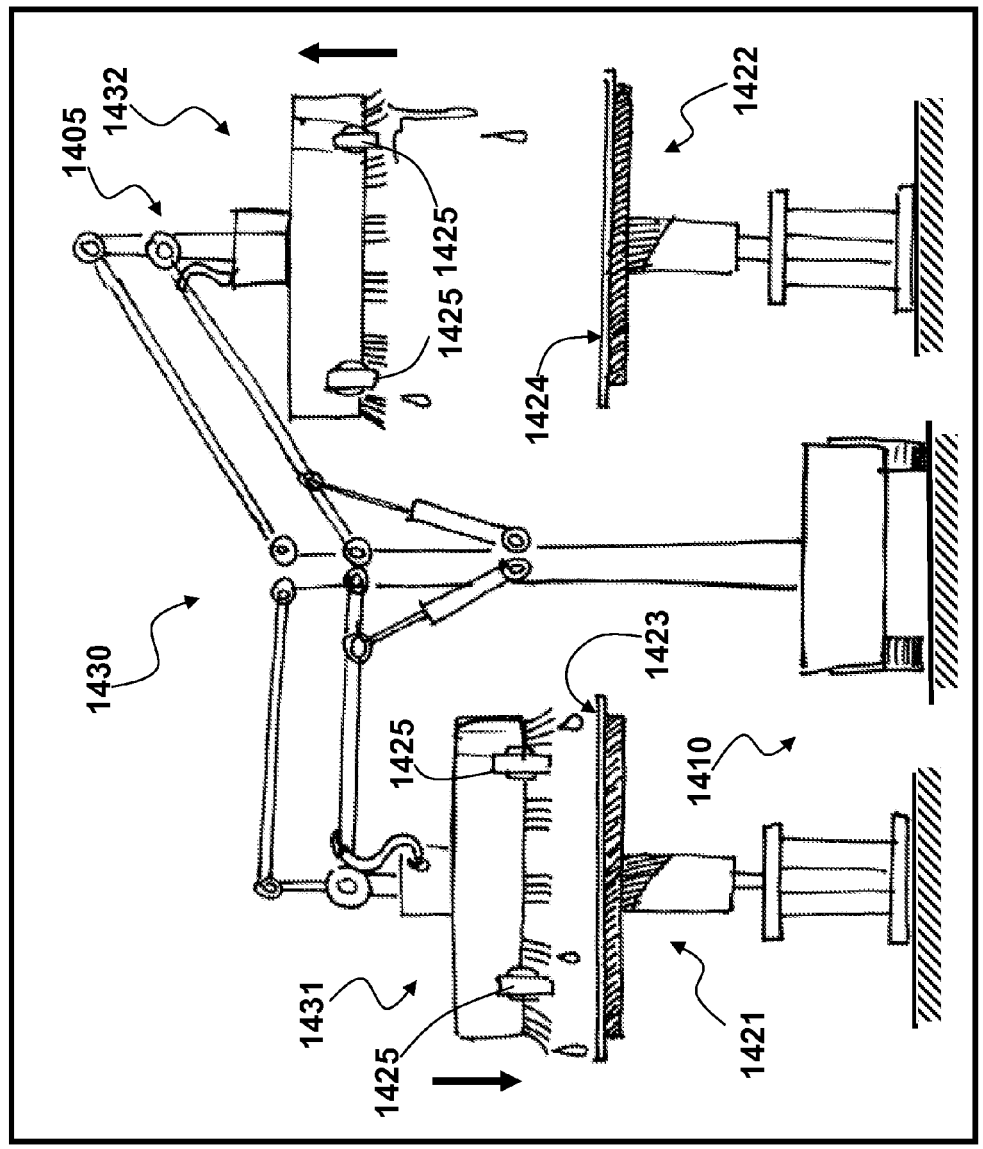
FIG. 14A depicts in a front elevational view a cleaning vehicle proximate to opposing heliostats, having a first end-effector being deployed for cleaning and a second end-effector being retracted from cleaning.
Figure 15:
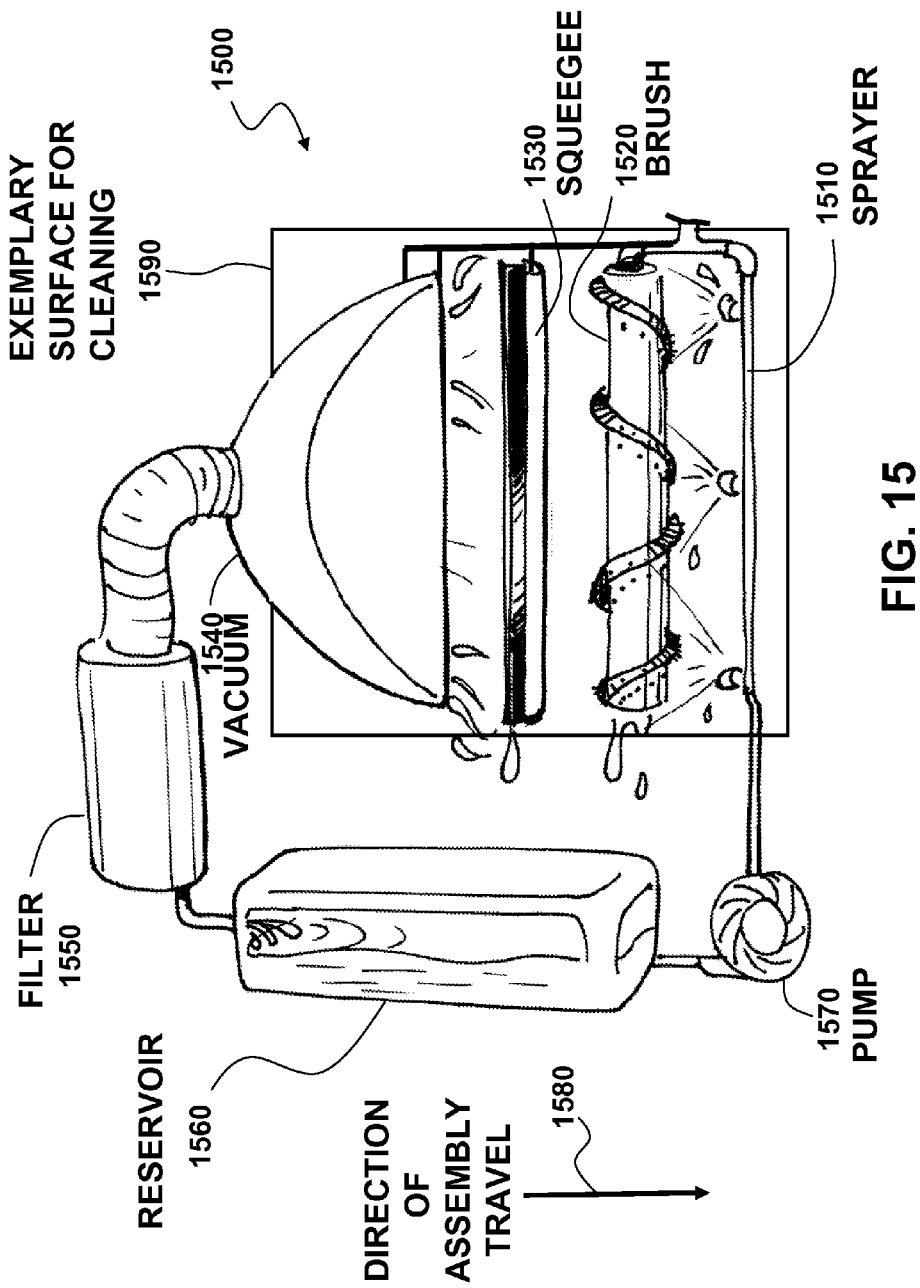
FIG. 15 depicts an exemplary end-effector cleaning assembly.

FIG. 14A depicts an elevational front view into an aisle 1410 of a heliostat field where the heliostats 1421, 1422 in this example orient in a horizontal position for cleaning The exemplary cleaning vehicle 1430 depicted in FIG. 14A comprises a pair of end-effectors 1431, 1432 where either may be translated across a surface 1423, 1424 of an opposing heliostat 1421, 1422, via for example skids or guides 1425, where each end-effector may comprise one or more of the following cleaning items: (a) a sprayer, e.g., low pressure sprayer or mister; (b) a brush, e.g., a cylindrical brush that may be fixed, or configured to spin and/or vibrate, a cupped brush that may be fixed, or configured to spin and/or vibrate, and a strip brush that may be fixed or configured to vibrate; (c) a squeegee; (d) a water vacuum system that may re-circulate the water; and (e) a forced-air dryer. Accordingly, the system may be configured to substantially clean and dry the reflectors, or substantially dry the reflectors after cleaning. As depicted in FIG. 14A, the system is also fault adaptive in that it can lift up an end-effector 1432 assembly to avoid a detected obstruction such as heliostat that may have failed to enter cleaning position. FIG. 14B depicts an end-effector 1460 assembly configured to rotate about a support joint of an end-effector arm 1405 to effect a brush-based cleaning FIG. 15 is a graphical depiction of an end-effector assembly 1500 comprising: (a) a sprayer 1510; (b) a rotating brush 1520; (c) a squeegee 1530; and (d) a vacuum 1540. The system embodiment comprising the depicted end-effector assembly 1500 may re-circulate the cleaning water through the filter 1550 shown attached to the vacuum 1540. The filtered water may be accumulated in a fluid reservoir 1560 that may be disposed on the cleaning vehicle and provided to the sprayer 1510 via a pump 1570. The direction 1580 of the assembly travel is shown as down the sheet, and thereby a stage set of cleaning steps may be executed as to the exemplary surface 1590 for cleaning.

FIG. 16 is a graphical depiction of an end-effector assembly 1600 illustrating by example a five-stage cleaning process. The end-effector assembly 1600 moves in the direction of the arrow 1601, over the exemplary surface 1602 for cleaning The staged cleaning process may be executed as follows: (a) the reflector 1602 is wetted via a spray bar 1610 with water and/or a cleaning solution accumulated from the vacuum step 1650, i.e., from stage 5; (b) the reflector 1602 is scrubbed with brush 1620 that may be active, e.g., configured with a cam and/or gear and motor 1621, or fixed; (c) the applied water or cleaning solution, now dirtier, is removed from the reflector surface via the squeegee 1630—where the removed water may or may not be recovered via a proximate gutter and conduit; (d) clean water, e.g., water having low total dissolved solids (i.e., low TDS), is sprayed onto the reflector as a rinse via a spray bar 1640; and (e) the rinse water is vacuumed (stage 5) via a water vacuum 1650, and thereafter may be accumulated, and accordingly the assembly clears the space above the reflector, leaving the reflector dry—in part to discourage dust accumulation. The accumulated water may then be used in stage 1 of another cycle of the exemplary process on the next reflector to be cleaned. The water efficient cleaning method of the system takes advantage of the water from the second water stage, i.e., the rinse stage, is typically clean enough so that it may be re-used to wet the reflector before scrubbing.

Any of the exemplary systems and and-effectors may be further configured to apply reflectometering ability, where, to the extent readings may correlate with the level of heliostat cleanliness, reflectometer readings of the heliostats prior to cleaning or after cleaning may be used to lengthen or shorten the cleaning time of the heliostat under test.

One of ordinary skill in the art will also appreciate that the elements, modules, and functions described herein can be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. Sections headings of the present application should not be read to limit claim scope. It is also contemplated that various combinations or subcombinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above. Accordingly, the invention has been disclosed by way of example and not limitation, and reference should be made to the following claims to determine the scope of the present invention.

What is claimed is:

1. A system comprising
    an array of a plurality of heliostats;
    a cleaning vehicle configured to clean at least a portion of a reflector of a heliostat of the array of heliostats via a cleaning end-effector, and wherein the cleaning vehicle is further configured to reorient the cleaning end-effector responsive to a detected proximate next heliostat reflector misoriented for cleaning;
    a heliostat controller and motor assembly configured to reorient a heliostat reflector from a non-cleaning mode to a cleaning mode, and responsive to at least one of: a command to reorient and a detected proximity of the cleaning vehicle to the heliostat reflector.

2. The system of claim 1 wherein the non-cleaning mode is a sun-tracking mode.

3. The system of claim 1 wherein the cleaning vehicle is further configured to translate to a region proximate to a heliostat oriented for cleaning.

4. The system of claim 1 wherein the cleaning vehicle is further configured to detect a heliostat reflector misoriented for cleaning.

5. The system of claim 1 wherein the cleaning vehicle is further configured to translate by retracing a path.

6. The system of claim 1 wherein the system further comprises one or more arrays and wherein the cleaning vehicle is further configured to be unidirectionally oriented and to execute a U-turn at a detected end of at least one array.

7. The system of claim 1 wherein the vehicle is self-navigating.

* * * * *